United States Patent Office 3,329,712
Patented July 4, 1967

3,329,712
SEPARATION OF DIBASIC ACIDS
Donald E. Danly, Cantonment, Fla., and Gordon L. Whitesell, St. Ann, Mo., assignors to Monsanto Company, St. Louis, Mo., a corporation of Delaware
Filed July 20, 1966, Ser. No. 566,653
5 Claims. (Cl. 260—537)

This application is a continuation-in-part of application Ser. No. 235,945, filed Nov. 7, 1962, and now abandoned.

This invention relates to a process for the separation of relatively pure dibasic acids from a mixture containing a plurality of these acids and more particularly relates to a process for the separation of succinic, glutaric and adipic acids from each other.

The production of pure dibasic acids by the oxidation of cycloparaffins is of considerable commercial importance at the present time because of the extensive use of such acids in the preparation of polyamide resins and because of the ready availability of cyclic hydrocarbons as starting materials from which the acids may be made. Much art is known and available which describes processes for the direct oxidation of cycloparaffins to a variety of products including a mixture of monobasic and dibasic acids. From the crude mixture of oxidation products of the processes known and used, separation of a single dibasic acid in a satisfactory degree of purity is difficult because the yields of any single acid are usually low.

Improvements in the processes known in the art have shown that yields of individual dibasic acids can be increased markedly where the oxidation is carried out in stages in which the cycloparaffins are air oxidized first to corresponding cyclic alcohols and ketones, and then the mixture of alcohols and ketones is nitric acid oxidized to a mixture of corresponding dibasic acids. The mixture of dibasic acids thus obtained, however, is difficult to separate in pure form because simple crystallization methods will not accomplish the separation and other means are expensive and time consuming. Even in the more sophisticated oxidation processes wherein only selective portions of the air oxidation product are subjected to nitric acid oxidation, mixtures of monobasic and dibasic acids are obtained which are difficult to separate even though the mixture contains predominant amounts of a single dibasic acid and only minor amounts of other monobasic and dibasic acids. The final separation of the dibasic acids appearing in minor amounts in a mixture from the predominant dibasic acid component of the mixture is generally accomplished by an aqueous purge of the mixture. However, conventional purging results in an appreciable loss of the predominant and desired acid.

An object of this invention is to provide a process for reasonably complete separation of dibasic acids from a solution containing a mixture thereof.

Another object is to provide a process for the separation of succinic, glutaric and adipic acids from aqueous solutions containing mixtures of these dibasic acids.

Other objects and advantages of this invention will appear hereinafter.

In a particular oxidation process, cycloparaffins are first air oxidized and a selected part of the oxidation product is nitric acid oxidized to give a mixture of monobasic and dibasic acids in an aqueous nitric acid solution. After crystallization of a portion of the adipic acid from this mixture, at least a part of the mother liquor remaining is subjected to evaporating conditions to reduce the nitric acid concentration of the liquor, and further crystallization of the adipic acid is effected. The mother liquor from this second crystallization contains adipic acid which cannot be crystallized successfully because the succinic acid contained therein crystallizes simultaneously with further crystallization of the adipic acid. In accordance with this invention, the adipic, succinic and glutaric acids contained in this mother liquor or the mixture remaining after evaporation to reduce the nitric acid concentration may be separated from each other in excellent yields and in a simple and economical manner.

By the process of this invention, the aqueous mother liquor described above, or any other aqueous mixture of succinic, glutaric and adipic acids which may or may not contain dilute nitric acid, other mineral acids, mineral salts, monobasic acids and dibasic acids, is contacted with a suitable immiscible solvent to remove most of the adipic acid and a portion of the succinic and glutaric acids in a first immiscible solvent phase leaving the remainder of the succinic and glutaric acids, as well as other components of the aqueous mother liquor in a first aqueous phase. As used in the specification and claims "immiscible" means that the solvent not only must be sufficiently insoluble in water that two phases are formed, but that less than about one gram of solvent dissolves in 100 grams of water, in order to reduce solvent losses into the various aqueous phases. Otherwise, apparatus would have to be provided to recover the solvent for reasons of economy.

After separation by either batch or continuous process methods, the immiscible solvent phase is then contacted with essentially adipic acid free water to obtain a second immiscible solvent phase and a second aqueous phase from which the adipic acid may be recovered easily by fractional crystallization or other methods. The mother liquor from this adipic acid crystallization, which contains succinic and glutaric acids from the first solvent phase is returned to the original aqueous mixture for retreatment in a similar manner. The second immiscible solvent phase remaining after contacting with adipic acid free water is essentially free of dibasic acids and may be reused for further contacting of the original aqueous mixture, if desired. The first aqueous phase resulting from the contacting of the dibasic acid aqueous mixture with the dibasic acid free immiscible solvent contains the succinic and glutaric acids not dissolved in the first immiscible solvent phase and is substantially free of adipic acid. The glutaric and succinic acids may be recovered in combination from this aqueous phase by any suitable method well known in the art or may be recovered individually by subsequent treatment. If it is desired to recover the succinic and glutaric acids individually, this first aqueous phase is contacted separately with a suitable immiscible solvent with the succinic acid being recovered by well known means from the resulting third aqueous phase and the glutaric acid from the resulting third solvent phase. To conserve solvent, the third solvent phase may also be contacted with glutaric acid free water and the resulting glutaric free solvent recycled for further use with the glutaric acid then being recovered by well known means from the resulting fourth aqueous phase.

A variety of immiscible solvents may be used for the contacting of the aqueous mixtures described above, and it has been found that saturated, unsubstituted straight or branched chain alcohols having from six to fifteen carbon atoms, as well as certain esters of these alcohols, are suitable materials.

Exemplary alcohols within this class are n-hexanol; 2-hexanol; n-heptanol; 2-octanol; 2-ethyl-1-hexanol; isooctanol; 2,6-dimethyl-heptanol; 2-decanol; 1-dodecanol; 1-tridecanol; and 1-pentadecanol. Various esters of the C6 to C–15 aliphatic alcohols are also suitable, such as esters of any of these alcohols with saturated monocarboxylic acids such as acetic, propionic, butyric, valeric, and caproic. The esters of any of these alcohols with adipic, glutaric and succinic acids, which esters may be formed during the present process, are themselves suitable solvents.

In order to illustrate further the process of this invention, reference will be made to the accompanying diagrammatic drawings in which.

In all instances in the figures, the same numbers are used to indicate the same means or part of the process.

Figure 1:
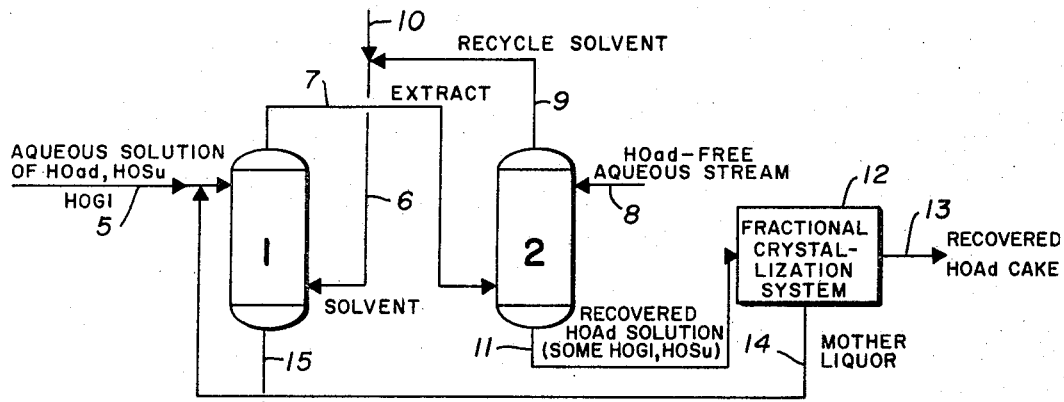
FIGURE 1 is a flow sheet for the process of this invention in which adipic acid is recovered from an aqueous solution of adipic, succinic and glutaric acids.

Referring now to FIGURE 1, the aqueous stream from which the succinic, glutaric and adipic acids are to be separated and recovered and which may contain other dibasic acids, as well as monobasic acids, mineral acids and mineral salts, enters contacting means 1 as indicated by line 5. Immiscible solvent from solvent storage or other (not shown) enters the system and is fed to contacting means 1 as indicated by line 6. Contacting means 1 may be any single or multistage means suitable for effecting the required extraction by obtaining intimate contact between the solvent and the aqueous stream, such as by countercurrent or concurrent liquid to liquid contacting, and may include any well known apparatus such as mixer-settler units, centrifugal contactors, packed or plate columns and rotating disc contactors. When the solvent used is lighter than water, the solvent may enter the bottom part of contacting means 1 and move countercurrent to the aqueous mixture entering the top portion of contacting means 1, and exit at the top of the contacting means, as indicated by line 7. If the solvent used is heavier than water, the solvent may enter the top portion of the contacting means, flow countercurrent to the aqueous mixture entering a the bottom portion, and exit from the bottom of the contacting means.

The solvent stream of line 7, which contains most of the adipic acid of the aqueous stream of line 5 and also a portion of the succinic and glutaric acids contained therein, proceeds to contacting means 2, which also may be any single or multistage contacting means suitable for effecting the required extraction by obtaining countercurrent or co-current liquid-to-liquid contacting and may include any of the well known apparatus such as mixer-settler units, centrifugal contactors, packed or plate columns and rotating disc contactors. In the embodiment shown in FIGURE 1, the solvent stream 7 enters the bottom portion of contacting means 2, passes up through the contacting means countercurrent to an adipic, glutaric and succinic acid free water stream 8 entering the top portion of the contacting means 2 and exits at the top of the said contacting means, as indicated by line 9, from where the solvent, which is now substantially free of succinic, glutaric and adipic acids, may be recycled for further extraction purposes. When the process is operated on a continuous basis, solvent can be added to the system through line 10 to replace quantities lost due to spills or other reasons.

The aqueous stream leaving from the bottom of contacting means 2, as indicated by line 11, contains most of the adipic acid entering the process by line 5 and minor concentrations of succinic and glutaric acids. The adipic acid may be recovered by a fractional crystallization system 12, which may comprise a means for selectively crystallizing the adipic acid separating it by filtration or centrifugation and decantation. The recovered adipic acid is indicated by line 13, and the mother liquor is returned through line 14 to the aqueous mixture line 5 for further recovery of any adipic acid remaining in the stream. If desired, a separate fractional crystallization system may not be provided and the product of line 11 may be fed directly to other already existing crystallization systems.

The aqueous stream leaving the bottom of contacting means 1, as indicated by line 15, contains the major portion of the succinic and glutaric acids contained in the inlet stream 5, and these dibasic acids may be separated therefrom individually, if desired, by a subsequent part of the process shown in FIGURE 3 which will be described later.

Figure 2:
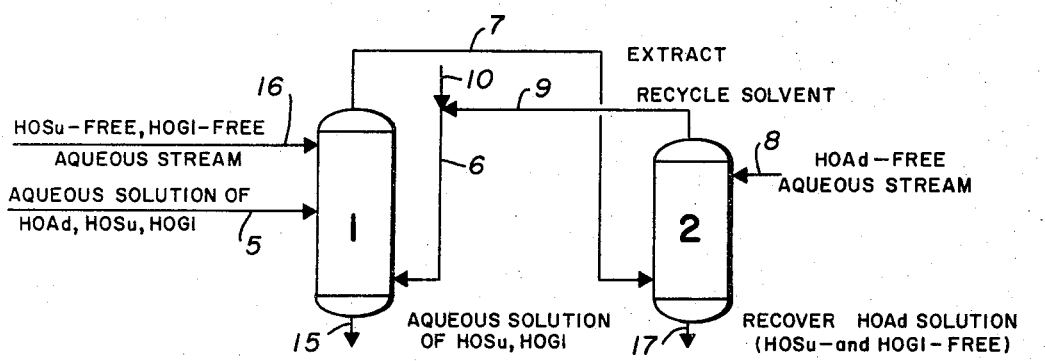
FIGURE 2 is a flow sheet for the process of this invention in which an aqueous solution of adipic acid is separated from an aqueous mixed solution of adipic, succinic and glutaric acids.

In FIGURE 2 there is shown a modification of the process described above and shown in FIGURE 1. In this modification, the process is substantially the same as described previously, except that an additional water stream is added to aid in the simplification of the recovery of the adipic acid. In the embodiment of FIGURE 2, an aqueous wash stream free from succinic and glutaric acids, as indicated by line 16, is fed to contacting means 1 countercurrent to the flow of the solvent, as shown entering contacting means 1 by line 6. This wash stream 16 is used to scrub the adipic, glutaric and succinic acid laden solvent stream of the glutaric and succinic acids contained therein. By proper adjustment of the water flow in line 16, the extract in line 7 will contain principally adipic acid and be substantially free from other dibasic acids. When the process is operated in this manner, aqueous effluent line 17 from contacting means 2 will contain adipic acid which can be recovered simply from the water by any well known means, or used in aqueous solution, if desired. If desired also, the adipic acid in the solvent of line 7 may be recovered directly from the solvent by fractional crystallization or the evaporation of the solvent which, after condensing, may be returned to contacting means 1 for further use.

Figure 3:
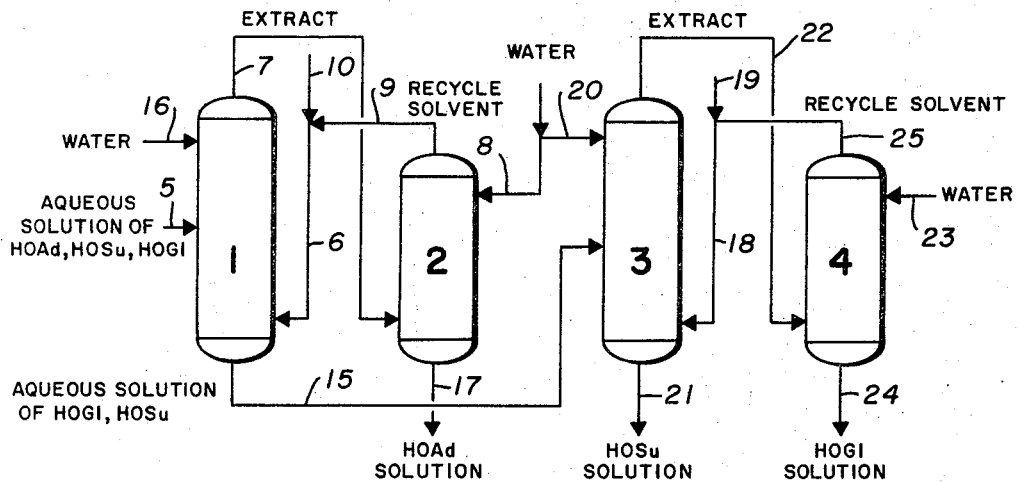
FIGURE 3 is a flow sheet of the process of this invention in which succinic, glutaric and adipic acids are separated individually from an aqueous solution containing these dibasic acids.

In FIGURE 3, the complete individual separation of the succinic, glutaric and adipic acids is shown. To accomplish the separation of the succinic and glutaric acids in the aqueous stream of line 15, the mixture in this line is fed to the top portion of contacting means 3, which may be similar or identical to those described for contacting means 1 and 2. Make-up solvent which may be the same or different from that of line 6, is fed to the process through line 19, and enters the bottom portion of contacting means 3 through line 18. The solvent flows countercurrent to the aqueous mixture of succinic and glutaric acids entering by line 15, extracts substantially all the glutaric acid therefrom, and is then scrubbed free of succinic by succinic acid free water entering contacting means 3, as indicated by line 20. The raffinate exiting from contacting means 3, as indicated by line 21, contains substantially all the succinic acid entering the contacting means 3 by line 15 and may be recovered therefrom by any suitable means such as evaporation.

The extract exiting from contacting means 3, as indicated by line 22, contains substantially all the glutaric acid entering contacting means 3 by line 15, and this extract is then fed to the lower portion of contacting means 4 which comprises the same type of apparatus as that of contacting means 1, 2 and 3, but not necessarily identical thereto. Glutaric-acid-free water enters the top portion of the contacting means 4, as indicated by line 23, scrubs substantially all the glutaric acid from the solvent and exits as an aqueus glutaric acid solution, as indicated by line 24. The glutaric-free solvent is returned for further extraction purposes as shown by line 25. The glutaric acid in the extract of line 24 may be recovered by evaporation of the solvent or other means, if desired, rather than by the aqueous extraction illustrated.

As can be seen clearly, the aqueous dibasic acid streams as indicated by lines 17, 21 and 24 may be used as aqueous streams or the individual dibasic acids may be recovered in concentrated solutions or as solid materials by simple methods such as evaporation and crystallization.

The above described process for the separation of adipic, glutaric and succinic acids from aqueous mixtures of these dibasic acids as well as other monobasic and dibasic acids may be operated economically and successfully when the feed stream to the process, line 5 of FIGURES 1, 2 and 3, is or may be made into an aqueous mixture of succinic, glutaric and adipic acids in the concentration by weight range shown in Table 1 below.

*Table 1.—Concentration of dibasics in feed stream weight percent*

| | Percent |
|---|---|
| Succinic acid | 3 to 20 |
| Glutaric acid | 5 to 40 |
| Adipic acid | 1 to 30 |

In the operation of the process, the degree of purity of the separation of the adipic, glutaric and succinic acids desired will determine the type of contacting means required; the number of effective stages thereof which are necessary; and the particular alcohol of the aliphatic C5 to C15 alcohols, or the ester thereof, which should be used as the immiscible solvent. Generally, the more efficient the separation desired, the more efficient the contacting means must be and the greater the selectivity of the solvent must be. Selectivity of the solvent is defined as the ratio of the distribution co-efficients of the dibasic acids to be separated in the solvent which is to be used.

Unexpectedly, it has been discovered that to effect the desired separation of the dibasic acids, the ratio of weight of the water in an aqueous mixture of dibasic acids fed to a contacting means (such as element 1 in FIGURE 1) to the weight of the solvent fed countercurrent thereto in the contacting means may be from 0.05 to 5.0 with the preferred range for the ratios being 0.2 to 2.0, and that the aqueous-to-organic weight ratio in the second extraction (such as element 2 in FIGURE 1) should be between 0.10 and 10.0. When the process of this invention is operated within this range of water to solvent ratios, individual separations in excess of 80% of the adipic, glutaric and succinic acids contained in the aqueous mixture fed to the process can be obtained easily and economically.

In the following examples, the columns have 1-inch inside diameters pack with 90 inches of quarter-inch ceramic saddles, and all steps are carried out at room temperature.

*Example I*

Feed stream 5 containing 4.6% adipic acid, 8.2% succinic acid, 23.4% glutaric acid, 2.4% nitric acid, and 61.4% water, is fed to column 1 at an average rate of 11.98 milliliters per minute. 2-octanol solvent is circulated through columns 1 and 2 and lines 7 and 9 at an average rate of 22.5 milliliters per minute. Water is added through line 8 at the rate of 24.72 milliliters per minute. This provides aqueous-to-organic ratios of 0.44 and 1.34 respectively, with theoretical extraction stages for adipic acid in these columns being 2.4 and 1.1, respectively. The recovered dried cake contains 84.3% adipic acid, 5.6% succinic acid, and 10.1% glutaric acid. Overall recovery in the cake is over 94% of the adipic acid in feed stream 5.

*Example II*

The process of Example I is repeated, using the feed stream and flow rates disclosed therein, except that 2-octanol is replaced by any one or more of 2-hexanol; 2-ethyl-hexanol; 1-tridecanol; 2-pentadecanol; 1-methyl-amyl acetate; n-hexyl butyrate; isooctyl valerate; n-pentadecyl caproate; 2-methyl-tridecyl butyrate; n-hexyl succinate; 2-methyl-amyl adipate; 1-methyl-heptyl adipate; decyl adipate; decyl glutarate or tridecyl adipate. In each case, the dried recovered cake contains in excess of 80% adipic acid, and overall recovery of adipic acid is in excess of 80% of that in the feed stream.

*Example III*

Feed stream 5 containing 7.8% adipic acid, 5.4% succinic acid, 16.1% glutaric acid, 0.9% nitric acid, and 69.8% water, is fed to column 1 at an average rate of 9.62 milliliters per minute. n-Decyl alcohol is circulated at an average rate of 21.07 milliliters per minute. Water is added through line 8 at an average rate of 29.97 milliliters per minute. This provides aqueous-to-organic ratios of 0.42 and 1.71 respectively, with theoretical extraction stages for adipic acid in the columns being 3.6 and 3.1 respectively. The dried recovered cake contains 91.0% adipic acid, 3.2% succinic acid, and 5.7% glutaric acid, and the overall recovery of adipic acid is over 80%.

*Example IV*

The process of Example III is repeated, using the feed stream and flow rates disclosed therein, except that n-decyl alcohol is replaced by any one or more of 2-hexanol; 2-ethyl-hexanol; 1-tridecanol; 2-pentadecanol; 1-methyl-amyl acetate; n-hexyl-butyrate; isooctyl valerate; n-pentadecyl caproate; 3-methyl-tridecyl butyrate; n-hexyl succinate; 2-methyl-amyl adipate; 1-methyl-heptyl adipate; n-decyl adipate; n-decyl glutarate or tridecyl adipate. In each case, the dried recovered cake contains in excess of 80% of adipic acid, and overall recovery of adipic acid is excellent.

Complete separation of the dibasic acids is illustrated by the examples with reference to FIGURE 3, wherein each of the columns is as described above with respect to Examples I–IV.

*Example V*

Feed stream 5 containing 4.6% adipic acid, 8.2% succinic acid, 23.4% glutaric acid, 2.4% nitric acid, and 61.4% water, is fed to column 1 at an average rate of 11.98 milliliters per minute. 2-octanol solvent is circulated through columns 1 and 2 and lines 7 and 9 at an average rate of 22.5 milliliters per minute. Water is added through line 8 at the rate of 24.72 milliliters per minute. This provides aqueous-to-organic ratios of 0.53 and 0.95 respectively, with theoretical extraction stages for adipic acid in these columns being 2.4 and 1.1 respectively. The recovered dried cake contains 84.3% adipic acid, 5.6% succinic acid, and 10.1% glutaric acid. Overall recovery in the cake is over 94% of the adipic acid.

The raffinate in line 15, containing 1.1% adipic acid, 6.8% succinic acid, 13.0% glutaric acid, 1.67% nitric acid, and the remainder water, is fed to column 3 at an average rate of 8.48 milliliters per minute. 2-octanol solvent is circulated through lines 18 and 22 and columns 3 and 4 at the rate of 42.4 milliliters per minute, while water is added through line 23 at the rate of 17.0 milliliters per minute. This provides aqueous-to-organic ratios of 0.2 and 0.4 respectively. Stream 21 contains about 81% of the succinic acid entering by line 15, while line 24 contains about 84% of the glutaric acid entering through line 15.

*Example VI*

The process of Example V is repeated, using the feed stream and flow rates disclosed therein, except that 2-octanol is replaced by any one or more of 2-hexanol; 2-ethyl-hexanol; 1-tridecanol; 2-pentadecanol; 1-methyl-amyl acetate; n-hexyl butyrate; isooctyl valerate; n-pentadecyl caproate; 2-methyl-tridecyl butyrate; n-hexyl succinate; 2-methyl-amyl adipate; 1-methyl-heptyl adipate; decyl adipate; decyl glutarate or tridecyl adipate. In each case, line 17 contains more than 80% of the adipic acid, line 21 contains more than 80% of the succinic acid, and line 24 contains more than 80% of the glutaric acid.

It is clear from this that the process of this invention provides a simple and economical method for separating adipic, glutaric and succinic acids from aqueous mixtures thereof, and does not have the inherent difficulties of processes known previously for the separation of these acids. By the process of this invention no high temperature heating systems or expensive and complicated apparatus are necessary as is the case in the usual methods of separation involving dehydration and distillation. Further, there is no problem of the plugging of process lines due to the crystallization or the "freezing out" of the succinic, glutaric, adipic or other dibasic acids being separated therein, and overall corrosion problems are reduced markedly. Other and various advantages will be apparent to those skilled in the art.

While in the foregoing specification various embodiments have been set forth and specific details elaborated for the purpose of illustration, it will be apparent to those skilled in the art that this invention is susceptible to other embodiments and that many of these details may be varied widely without departing from the basic concept and the spirit of the invention; and it is to be understood that the invention is not to be limited to the specific embodiments thereof except as defined in the appended claims.

We claim:

1. A process for the recovery of adipic acid from an aqueous solution of dibasic acids comprising succinic, glutaric and adipic acids, comprising, in combination, the steps of:
    (a) forming a first mixture by intimately contacting said aqueous solution with sufficient immiscible solvent to provide a water-to-solvent ratio between 0.05 and 5.0, said solvent being selected from the group consisting of saturated aliphatic alcohols having from six to fifteen carbon atoms, and esters of said alcohols with acetic, propionic, butyric, valeric, caproic, adipic, glutaric, and succinic acids,
    (b) separating the resulting first mixture into a first aqueous phase and a first solvent phase,
    (c) forming a second mixture by intimately contacting said solvent phase with sufficient water to provide a water-to-solvent ratio between 0.10 and 10,
    (d) separating said second mixture into a second aqueous phase and a second solvent phase, and
    (e) recycling said second solvent phase for further contacting with said aqueous solution.

2. The process defined in claim 1, further comprising recovering adipic acid from said second aqueous phase.

3. A process for the separation of succinic acid from an aqueous solution containing succinic and glutaric acids, comprising in combination, the steps of:
    (a) forming a first mixture by intimately contacting said aqueous solution with sufficient immiscible solvent to provide a water-to-solvent ratio between 0.05 and 5.0, said solvent being selected from the group consisting of unsubstituted saturated aliphatic alcohols having from six to fifteen carbon atoms, and esters of said alcohols with acetic, propionic, butyric, valeric, caproic, adipic, glutaric, and succinic acids;
    (b) separating the resulting first mixture into a first aqueous phase and a first solvent phase;
    (c) forming a second mixture by intimately contacting said solvent phase with sufficient water to provide a water-to-solvent ratio between 0.10 and 10,
    (d) separating said second mixture into a second aqueous phase and a second solvent phase; and
    (e) recycling said second solvent phase for further contacting with said aqueous solution.

4. The process defined in claim 3, further comprising recovering succinic acid from said first aqueous phase.

5. The process defined in claim 3, further comprising recovering glutaric acid from said second aqueous phase.

References Cited

UNITED STATES PATENTS

| | | | |
|---|---|---|---|
| 2,978,473 | 4/1961 | Chafetz et al. | 260—537 |
| 3,180,878 | 4/1965 | Campbell et al. | 260—537 |

LORRAINE A. WEINBERGER, *Primary Examiner.*

VIVIAN GARNER, *Assistant Examiner.*